(12) United States Patent
Kularatna et al.

(10) Patent No.: US 7,907,430 B2
(45) Date of Patent: Mar. 15, 2011

(54) HIGH CURRENT VOLTAGE REGULATOR

(75) Inventors: Nihal Kularatna, Auckland (NZ); Lewis Jayathu Fernando, Kalutara (LK)

(73) Assignee: WaikotoLink Limited, Hamilton (NZ)

( * ) Notice: Subject to any disclaimer, the term of this patent is extended or adjusted under 35 U.S.C. 154(b) by 174 days.

(21) Appl. No.: 12/338,723

(22) Filed: Dec. 18, 2008

(65) Prior Publication Data

US 2010/0156369 A1    Jun. 24, 2010

(51) Int. Cl.
  *H02M 3/18*     (2006.01)
  *G05F 1/00*     (2006.01)
  *H02J 7/00*     (2006.01)

(52) U.S. Cl. ............................ 363/59; 323/266; 320/167

(58) Field of Classification Search .............. 363/59; 323/266; 327/536; 320/167, 142
See application file for complete search history.

(56) References Cited

U.S. PATENT DOCUMENTS

| | | | |
|---|---|---|---|
| 4,779,037 A | 10/1988 | LoCascio | |
| 5,663,874 A | 9/1997 | Mader et al. | |
| 5,939,867 A * | 8/1999 | Capici et al. | 323/277 |
| 6,028,417 A | 2/2000 | Ang et al. | |
| 6,122,273 A * | 9/2000 | Cantwell et al. | 370/359 |
| 6,226,193 B1 | 5/2001 | Bayer et al. | |
| 6,703,943 B1 * | 3/2004 | Lalla et al. | 340/870.39 |
| 6,707,280 B1 * | 3/2004 | Liu et al. | 323/224 |
| 6,759,836 B1 | 7/2004 | Black, Jr. | |
| 7,030,355 B1 * | 4/2006 | Bochenski et al. | 250/207 |
| 7,235,959 B2 | 6/2007 | Sicard | |
| 7,701,183 B2 * | 4/2010 | Hsieh et al. | 323/273 |
| 2005/0040796 A1 | 2/2005 | Sutardja | |
| 2007/0236190 A1 | 10/2007 | Kruiskamp et al. | |
| 2007/0296274 A1 | 12/2007 | Wang et al. | |
| 2008/0143308 A1 | 6/2008 | Hsieh et al. | |
| 2008/0203991 A1 | 8/2008 | Williams | |

FOREIGN PATENT DOCUMENTS

| | | |
|---|---|---|
| EP | 1 806 640 A2 | 7/2007 |
| EP | 1 806 640 A3 | 7/2007 |
| EP | 1 806 640 B1 | 7/2007 |
| WO | WO-2008/082578 A1 | 7/2008 |

OTHER PUBLICATIONS

International Search Report mailed on Mar. 21, 2010, for PCT Patent Application No. PCT/NZ2009/000293, filed on Dec. 17, 2009, 1 page.

Morrison, D. (Jun. 2006). "Portable Power Management Inspires Mega Integration," *Power Electronics Technology* pp. 54-56.

(Continued)

*Primary Examiner* — Shawn Riley
(74) *Attorney, Agent, or Firm* — Morrison & Foerster LLP

(57) ABSTRACT

A linear voltage regulator which includes on its input side an array of switched super capacitors coupled between the power source and the load. This apparatus is capable of delivering currents typically from milliamperes to greater than several amperes at very low switching frequencies. In addition by using capacitors rather than resistors or transistor devices to drop voltage on the input side, power consumption is reduced. The array of capacitors is switched by simple analog circuitry or a switching logic with or without a processor subsystem and the capacitors themselves are of the super capacitor type, thus providing very high capacitance, and are effectively series connected during certain phases of operation with the input terminal of the conventional linear voltage regulator portion of the apparatus. Energy stored in the super capacitors during the various phases of operation is reused.

15 Claims, 6 Drawing Sheets

OTHER PUBLICATIONS

National Semiconductor Corporation. (Jun. 2007). "LP3971 Smart Power Reference Design—8 Outputs—RD—139," *located at* <http://webench.national.com/rd/RD/RD-139.pdf>, last visited on Sep. 23, 2008, 16 pages.

National Semiconductor Corporation. (2008). "RD-139—LP3971 Smart Power Reference Design—8 Outputs," *located at* <http://www.national.com/rd/RDhtml/RD-139.html>, last visited on Sep. 23, 2008, 2 pages.

Supercapacitors.org (Date Unknown). "How a Super Capacitor Works," *located at* <http://www.supercapacitors.org/howtheywork.html>, last visited on Nov. 1, 2010, 2 pages.

Wikipedia.com (Sep. 23, 2008). "Electric Double-Layer Capacitor," *located at* <http://en.wikipedia.org/wiki/Supercapacitor>, last visited on Sep. 23, 2008, 7 pages.

Written Opinion of the International Searching Authority t mailed on Mar. 21, 2010, for PCT Patent Application No. PCT/NZ2009/000293, filed on Dec. 17, 2009, 5 pages.

* cited by examiner

HIGH CURRENT VOLTAGE REGULATOR

FIELD OF THE INVENTION

This disclosure relates to voltage regulators (power supplies) used for supplying electric current.

BACKGROUND

Voltage regulators are well-known in the electrical engineering field. They are also referred to as "power supplies" and are electronic or electrical circuits which output electric current at a particular DC (direct current) voltage level. They are widely used in electrical and electronic devices. Typically the actual electricity source is mains current or a battery and these voltage regulators convert and condition the battery output or mains current to a particular voltage level.

All electronic circuits, analog or digital, require such a well-regulated and stabilized DC power supply. An ideal DC power supply provides a constant output voltage irrespective of the value of the load current and the nature of the load while the output is free of noise, ripple and transient dips or surges. In modern electronic systems, DC power requirements vary widely. In small portable electronic devices, DC power supplies carry multiple "rail" voltages and values may vary from ±15 V to sub 1 V levels. Common values of voltage rails (supply) are 48V, 24V, 12V, 9V, 6V, 5 V, 3.3 V, and 1.8 to 3 V. Typical current output capability varies from tens of milliamperes to several amperes.

For larger non-portable devices with processor subsystems, a DC power supply typically has an output voltage from +5 volts to less than 3.3 volts with current requirements of several to 150 amperes. Efficiency of a power supply, particularly in high current systems, is of primary concern to avoid power wastage. A requirement for a portable device of course is also to achieve compactness of the power supply along with efficiency so as to minimize battery drain. Typical DC power supplies are linear, switch mode, and switched capacitor type, although these all have various deficiencies.

FIG. 1 shows a prior art "low drop out" (LDO) linear voltage regulator of FIG. 1 of LoCascio U.S. Pat. No. 4,779,037, incorporated herein by reference in its entirety. This is a low drop out voltage regulator with a switched redundant input. "Low drop out" refers to having a low dropout voltage. Such low dropout voltage regulators are of the type generally referred to as linear voltage regulators. The FIG. 1 device includes error amplifier 1 to compare an input reference voltage applied at terminal 4 to a signal proportional to the output voltage. Error amplifier 1 controls transistor 2 through which output current flows by adjusting transistor 2 so the output voltage at terminal $V_{out}$ equals a fixed multiple of the reference voltage. The source or input voltage, which is typically unregulated, is supplied here from a battery connected at terminal VBAT via a diode $D_{10}$ to the emitter of transistor 2.

In FIG. 1, a redundant source voltage $V_{in}$ is also supplied, although this is not always the case with such devices. In this case, the redundant voltage is supplied from capacitor $C_1$. Capacitor $C_2$ is provided for filtering at the output terminal $V_{out}$. Also in this case coupled at the collector of transistor 2 are two series connected resistors $R_1$ and $R_2$. Such a voltage regulator is characterized by its "drop out" voltage, which is the lowest source voltage which allows the regulator output voltage to remain substantially constant at some proportion of the reference voltage.

Voltage regulators have several performance parameters. One is noise created by circuit elements in the regulator circuit. High noise levels are undesirable since they may be RF (radio frequency) signals which interfere with operation of other portions of an electronic device of which the voltage regulator is a part. Most switch mode regulators generate noise at a frequency of 100 kHz to 3 MHz, which is undesirable. Another parameter is the output current capability since it is important for certain applications that the voltage regulator output relatively high levels of current. Typically however, high levels of current require switching regulators rather than low noise linear regulators of the type shown in FIG. 1. It is a drawback that typically linear regulators are not capable of high amperage (current) output due to excessive heating effects in the series or the shunt transistor elements in the regulator.

Efficiency is also important and refers to the proportion of input power dissipated in the voltage regulator. The approximate efficiency of a typical linear voltage regulator (of the type shown in FIG. 1) is proportional to $V_{out}/V_D$, where in FIG. 1 $V_D$ is the supply voltage of the battery VBAT. Often a minimum amount of voltage drop is needed between the supply voltage and output voltage to achieve regulation, hence there is a limit to the highest efficiency possible in a given design. However, use of a series resistor or allowing a larger voltage drop across the transistor to drop the voltage is inefficient since these are inherently power dissipation devices and inefficient. The present inventors have identified that it would be useful to be able to drop part of the difference between the supplied voltage and the regulated output in a non-resistive fashion to improve efficiency. Clearly the lower this effective input voltage to the voltage regulator, the higher its efficiency.

SUMMARY

In accordance with the invention, a linear voltage regulator circuit has its power input terminal series connected to one or more super capacitors. The super capacitors are coupled thereto by an array of switches. The super capacitor array functions as an input voltage dropper in lieu of a resistor or transistor with a large voltage drop as described above. A capacitor in series takes up part of the voltage drop which directly contributes to heat dissipation and it allows the circuit to reuse the energy stored in the capacitor. Once a capacitor is fully charged, it blocks DC current, so series capacitors have not been a practical means of reducing power dissipation of a linear regulator. However, very large capacity capacitors (so-called "super capacitors") are now commercially available which take a longer time to charge and hence allow for a low switching frequency of the capacitors. This has the advantage of charging the super capacitors for a relatively longer time without blocking the DC current path and indirectly reducing high frequency noise generation, due to the low frequency switching of capacitors.

Since even a super capacitor alone and in series when subject to DC voltage charges up eventually and stops conducting, the capacitor alone is not suitable. However by using a switched capacitor array, the capacitors are cyclically charged and discharged to provide a suitable voltage drop with minimal loss. This provides a voltage regulator of the linear type that has high efficiency, low noise generation and outputs high current if needed. In embodiments of the present voltage regulator, the capacitor changeover frequency, which relates to the switching frequency, is only in the range of typically fractional Hz to 300 Hz, about ¹/₁₀₀₀ of that of switched mode regulators and which advantageously is not RF. The present regulator in various embodiments delivers currents in excess of 1 ampere, up to 10 amperes or more. Typically such high current draw requirements in the past required switching voltage regulators, which are inherently noisy, rather than a low noise linear voltage regulator as used here. Furthermore efficiency of the present regulator is about 60-85% and especially high under no-load conditions.

Super capacitors are well-known devices also referred to as electric double-layer capacitors or ultracapacitors. The term "super capacitor" here is intended to include these. Such devices are electrochemical capacitors having an unusually high energy storage density compared to ordinary, for instance, electrolytic capacitors. They store charges thousands of times greater than a physically similar sized electrolytic capacitor. For instance, a typical D-cell sized electrolytic capacitor has a capacitance of only hundreds of microfarads, while the same size super capacitor has a capacitance range of 0.1 farads to several farads, or even up to a few hundreds of farads which is an improvement of about 10,000 times. Commercial double-layer capacitors are available having capacities as high as 5,000 farads.

Unlike traditional capacitors, electric double-layer or super capacitors do not have a conventional dielectric, but instead include a structure that contains an electrical double layer. Hence, the effective thickness of the dielectric is exceedingly thin, which combined with a very large surface area, is responsible for the high capacitances. Each of the two layers by itself is quite conductive, but at the interface where the layers are effectively in contact, no significant current can flow between the layers. However the double layer can typically only withstand a relatively low voltage, so such super capacitors typically have relatively low voltage ratings.

DETAILED DESCRIPTION

Figure 1:
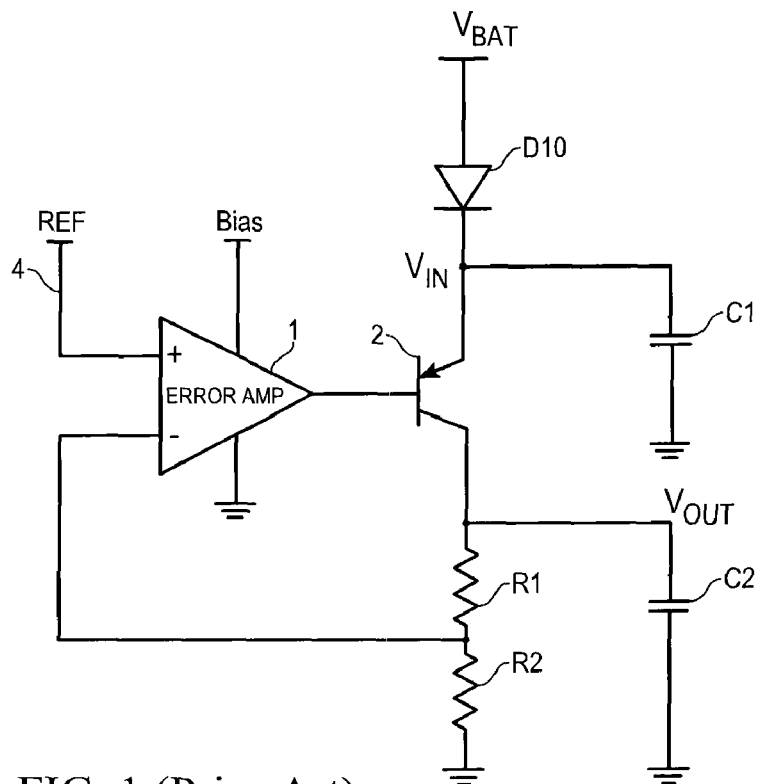
FIG. 1 shows schematically a prior art linear voltage regulator of the low drop out type.
Figure 2A:
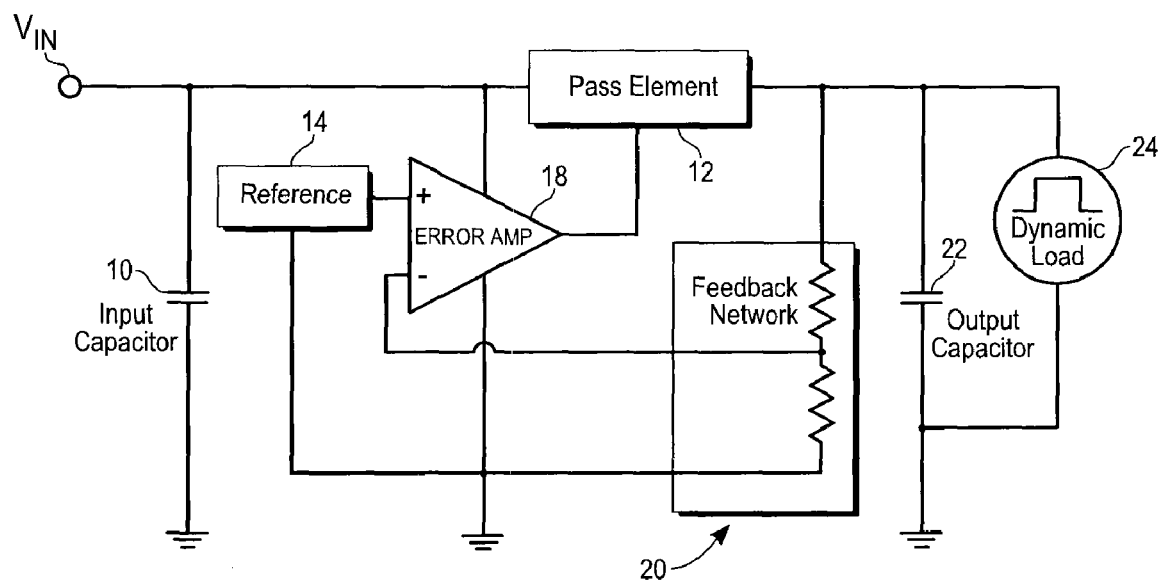
FIGS. 2A and 2B show variations of the FIG. 1 device, also in the prior art.
Figure 2B:
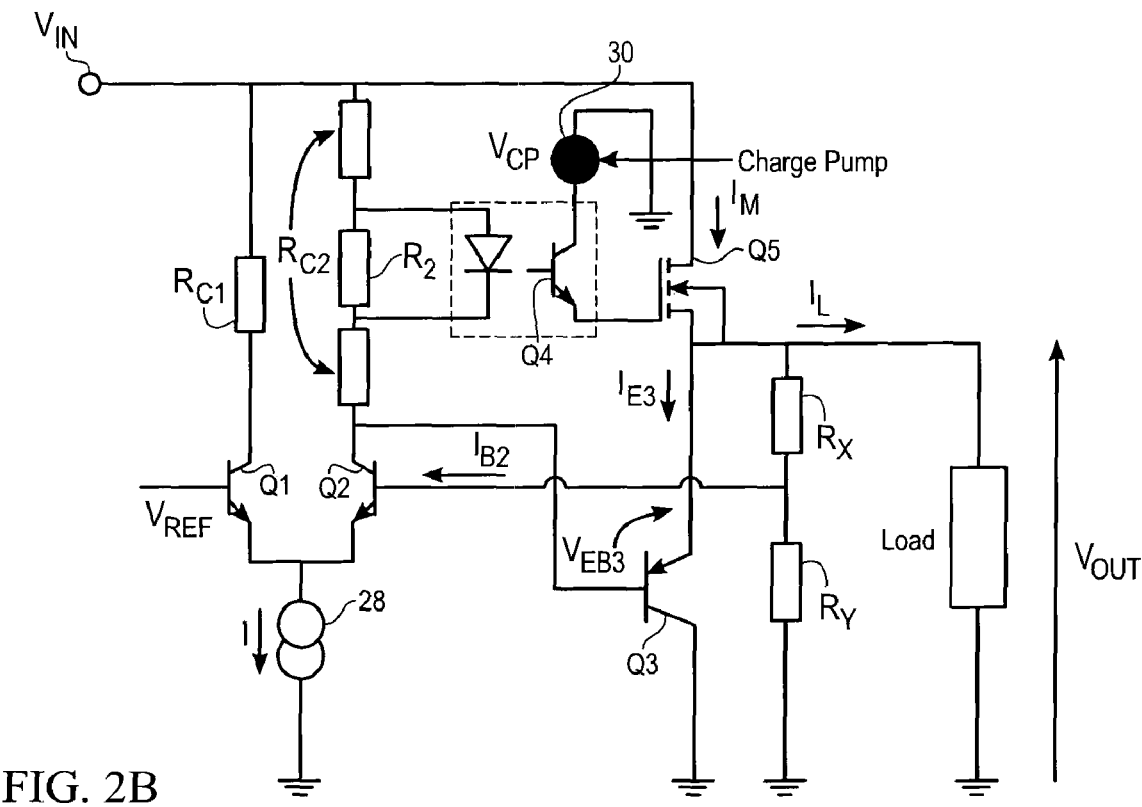

FIGS. 2A and 2B show schematically in the prior art variations of the FIG. 1 LDO linear voltage regulator. The FIG. 2A type is referred to as a series type and is typically found in commercial-type integrated circuit voltage regulators, while FIG. 2B shows a shunt or parallel type voltage regulator. The FIG. 2A circuit includes input capacitor 10 coupled to a pass element 12. The reference voltage terminal 14 and the feedback network 20 are coupled to the error amplifier 18. On the output side, there is a second (output) capacitor 22 and dynamic load 24 (not shown in FIG. 1). The FIG. 2B device includes an error amplifier based on transistors Q1 and Q2 and the current source 28. Resistors RC1 and RC2 are part of this error amplifier. A charge pump 30 is connected to a third transistor Q4 which may be inside an opto-isolator in this shunt regulator configuration. Power transistors Q3 and Q5 are connected between the unregulated input, regulated output terminal and ground, with the resistors $R_X$ and $R_Y$ as shown functioning as the feedback network to have closed loop regulation.

Figure 3:
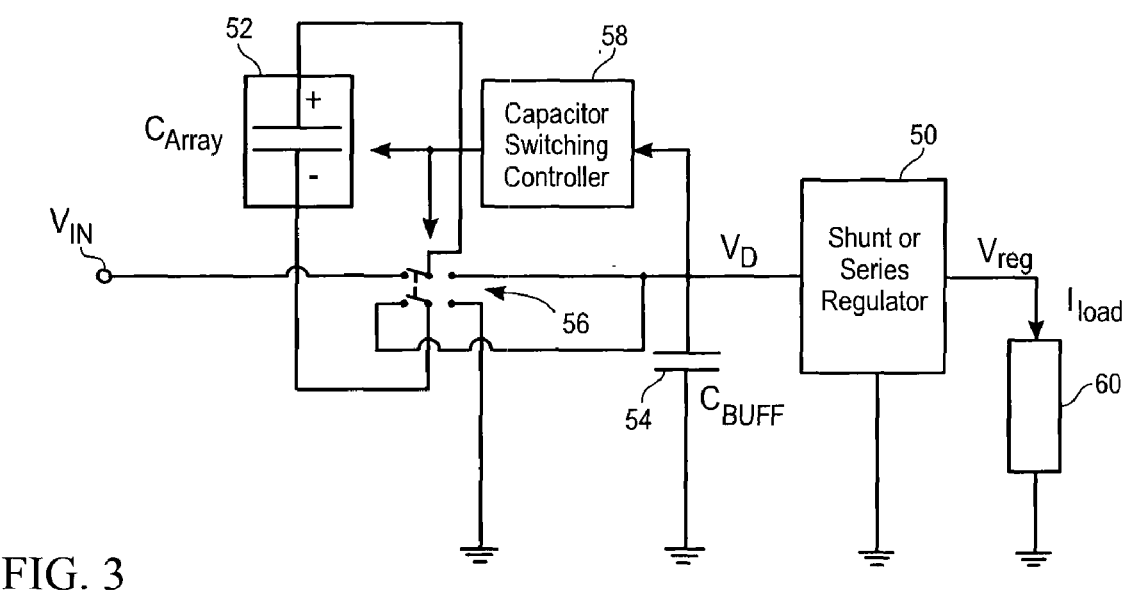
FIG. 3 shows in a combined schematic and block diagram a linear voltage regulator in accordance with the present invention.

FIG. 3 shows schematically in accordance with the invention a low dropout type linear voltage regulator. The main portion of this is the conventional shunt or series LDO linear voltage regulator 50, which corresponds for instance to the prior art devices of FIGS. 1, 2A or 2B. In this case capacitance $C_{Array}$ 52 is a super capacitor array with associated switches 56 arranged according to the level of the unregulated input voltage applied at terminal Vin as explained below. Capacitor $C_{BUFF}$ 54 may be a super capacitor or any other suitable capacitor which is used to power the LDO for capacitor charging and discharging change-over points. Operation of switches 56 is controlled by conventional capacitor switching controller 58 which is, e.g., logic circuitry, mixed signal circuitry or a suitable microcontroller. The regulated output voltage is at terminal $V_{reg}$, corresponding to $V_{out}$ in FIG. 1. The load is shown generally at 60. The capacitors in the array $C_{Array}$ are switchably connected by switches 56 to the $V_D$ input terminal of regulator 50 so as to take up the larger part of the voltage drop between terminals $V_{in}$ and $V_D$ so that efficiency is improved.

While charging such a series connected super capacitor array, it takes up most of the dropout voltage energy, related to $(V_{in}-V_D)*I_{load}$, which is stored in the capacitors of the array $C_{Array}$ and the voltage drop is taken over by the capacitors in the array $C_{Array}$. This is in contrast to a conventional linear regulator where this drop is across a resistive element, such as a transistor or resistor and is responsible for the bulk of the efficiency loss. Thereby efficiency of the present regulator is high and comparable to that of a switching regulator. Using an array of super capacitors $C_{Array}$ and switches 56 to charge up to approximately the voltage level of $V_{in}-V_D$, the FIG. 3 circuit can operate with ideally no loss, except for whatever internal resistance is present in the super capacitor array $C_{Array}$ and/or the switches 56, and, any transient related energy losses.

During periods of charging and discharging, the voltage variation across the capacitor array, $C_{Array}$, is $$\Delta V_C = \frac{I_L \Delta t}{C},$$

where $I_L$ is the load current and $\Delta t$ is the charge or discharge time. If the value C is high, which is of course the case with the super capacitors in $C_{Array}$, then $\Delta V_C$ is small during the time of charging and discharging while passing a current through the capacitors to keep the regulator and load working. That is, there are no dropouts. The goal is to keep the effective $\Delta V_C$ within the value of $V_{Dmax}-V_{Dmin}$, where these refer respectively to the maximum and minimum voltages at terminal $V_D$ during the charging or discharging modes.

In this case the super capacitors in the array $C_{Array}$ are switched by switches 56 at relatively low frequencies to minimize noise. The goal is to switch array $C_{Array}$ to obtain the best effective $\Delta V_C$ over a full switching cycle, as explained below.

Figure 4A:
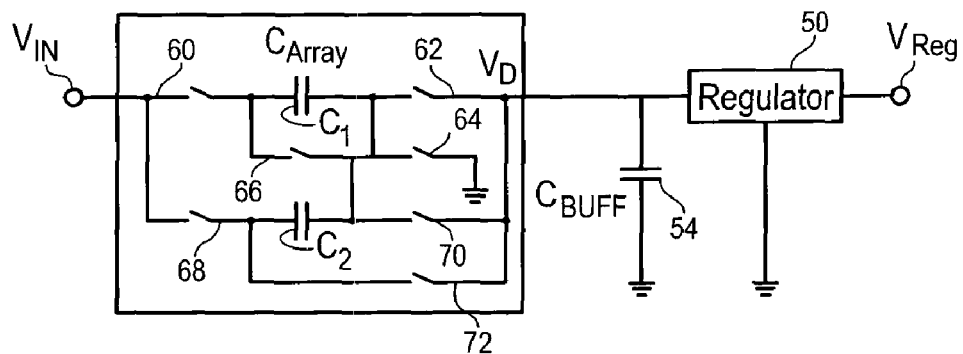
FIGS. 4A-4D show operation of the FIG. 3 circuit.
Figure 4B:
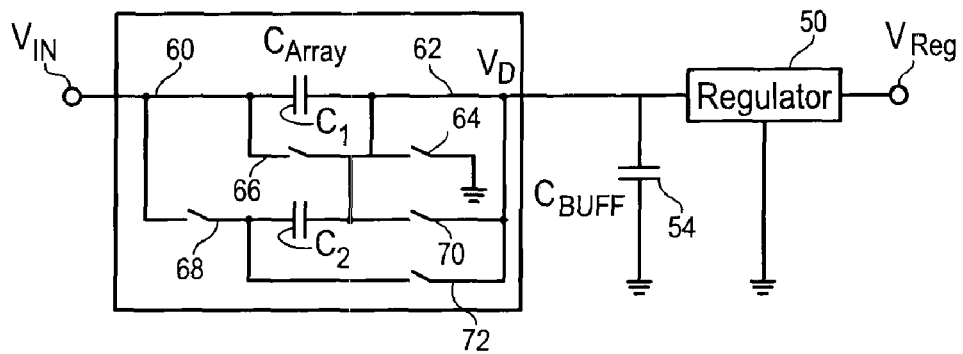
Figure 4C:
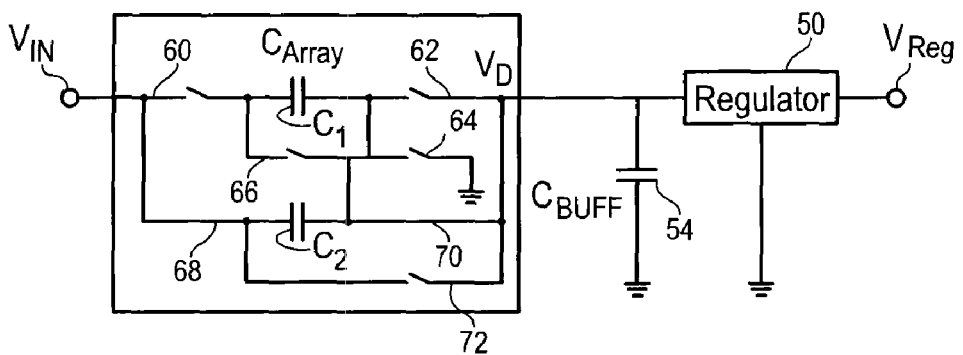
Figure 4D:
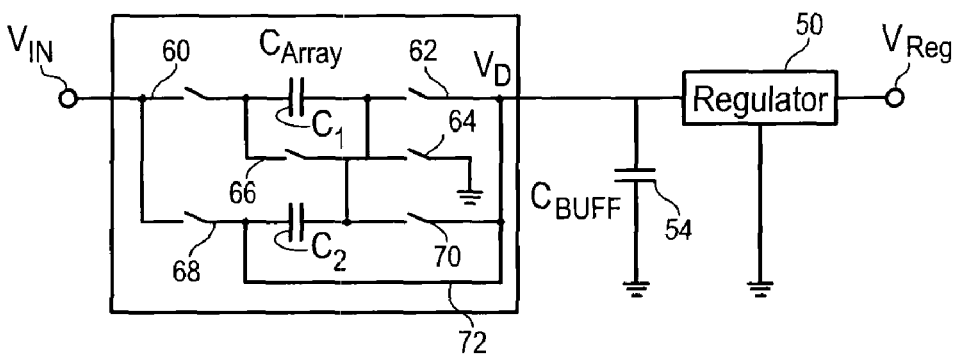

FIGS. 4A-4D illustrates an exemplary capacitor switching cycle for the FIG. 3 apparatus. FIG. 4A shows key elements of the FIG. 3 circuit with like elements similarly labeled, except that here instead of showing $C_{Array}$ 52 and the switches 56 generally, a more detailed network is shown with two super capacitors $C_1$ and $C_2$ and associated switches 60, 62, 64, 66, 68, 70 and 72. In one embodiment these switches are each a transistor or a solid state relay with sufficient capacity to carry the expected currents at the required voltages. Such transistors are generally referred to as "power transistors" and may be integrated or discrete devices. Possible switch devices are bipolar power transistors, power mosfets, insulated gate bipolar transistors, thyristors, or solid state relays. Any type of semiconductor switch with adequate capacity or even a mechanical relay is usable. In FIG. 4D, load 60 is not shown, merely for simplicity. FIG. 4A shows the circuit itself, but not in any operating mode, and is only for purposes of circuit illustration.

FIGS. 4B-4D show the three consecutive operating phases, labeled Phase 1, Phase 2 and Phase 3, through which the circuit cycles on a continuous basis. It is to be understood that each switch in FIG. 4 is conventionally controlled by the capacitor switching controller 58 of FIG. 3, also omitted here for simplicity. Such control of switches is routine in the power supply field and so no further detail is provided.

In Phase 1 in FIG. 4B, assume the input voltage $V_{in}$ is 5.5 V, the capacitor array has no internal resistance and the resistance across each switch in its ON state is zero. In Phase 1, capacitor $C_1$, which is connected by switch 60 to terminal $V_{in}$, charges from 1.75 V to 2 V. Capacitor $C_2$ remains at its previous state (since it is disconnected by switches 68 and 70) at 1.75 V. The voltage at terminal $V_D$, which is connected by switch 62 to capacitor $C_1$, increases to 5.5−1.75 volts=3.75 V, then decreases linearly to 5.5−2 V=3.5 V.

In FIG. 4C which is Phase 2, capacitor $C_1$ is disconnected at all three of its terminals and capacitor $C_2$ as shown is series connected between terminals $V_{in}$ and $V_D$. At this point capacitor $C_1$ remains at 2 V since it is disconnected, while capacitor $C_2$ charges from 1.75 V to 2 V. Then $V_D$ increases to 5.5−1.75 V=3.75 V, then decreases linearly to 5.5−2 V=3.5 V. Typically the voltage is cycling only between 3.75 and 3.5 volts in these two phases. In the last Phase 3 shown in FIG. 4D, both capacitors $C_1$ and $C_2$ are disconnected from input terminal $V_{in}$, but are connected to discharge via switch 72 to terminal $V_D$. Capacitor $C_1$ discharges from 2 to 1.75 V and similarly capacitor $C_2$ discharges from 2 to 1.75 V. Hence the voltage at $V_D$ increases to 4 V and then decreases linearly to 3.5 V. The total voltage swing here is only 3.5-4 V, which is a relatively modest, thereby providing relatively linear voltage. As pointed out above, the typical switching frequency is a fraction of a Hz to 300 Hz, so each phase is approximately a few seconds to 3 milliseconds in duration.

Figure 5A:
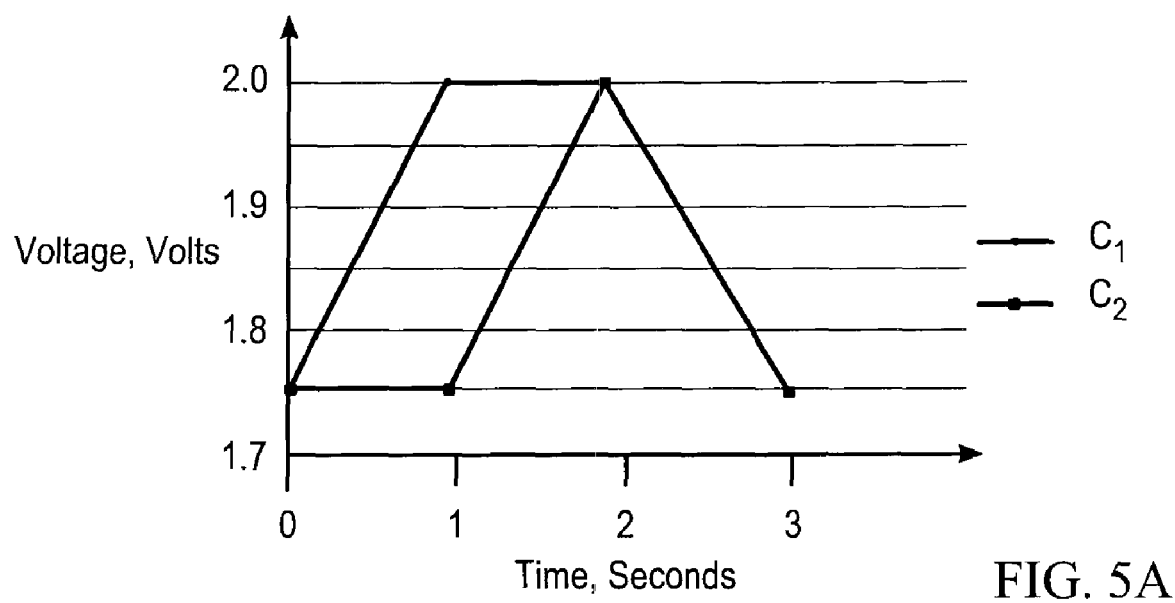
FIGS. 5A and 5B show graphically operation of the FIG. 3 circuit.
Figure 5B:
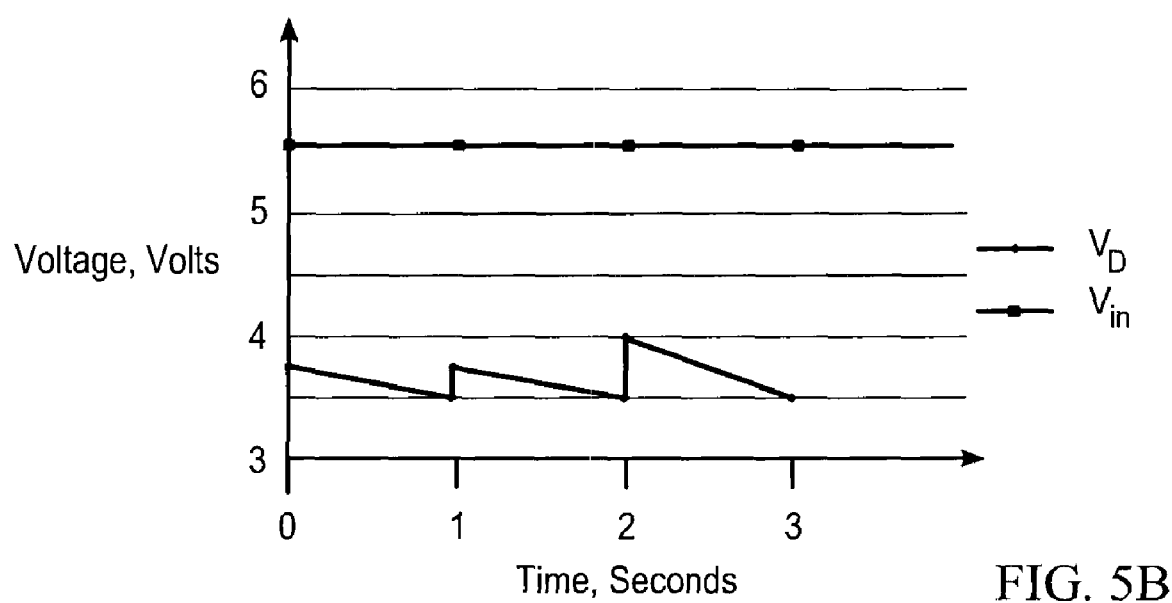

FIGS. 5A and 5B show this operation graphically. In FIG. 5A, the horizontal scale is time (in seconds) and the vertical scale is voltage (in volts). There are two plots, for capacitors $C_1$ and $C_2$.

FIG. 5B shows operation of the regulator at terminals $V_D$ and $V_{in}$ where again the horizontal scale is seconds and the vertical scale volts. The supply voltage at terminal $V_{in}$ is constant, while the voltage at terminal $V_D$ fluctuates within the relatively narrow range of 3.5-4 V.

Figure 6A:
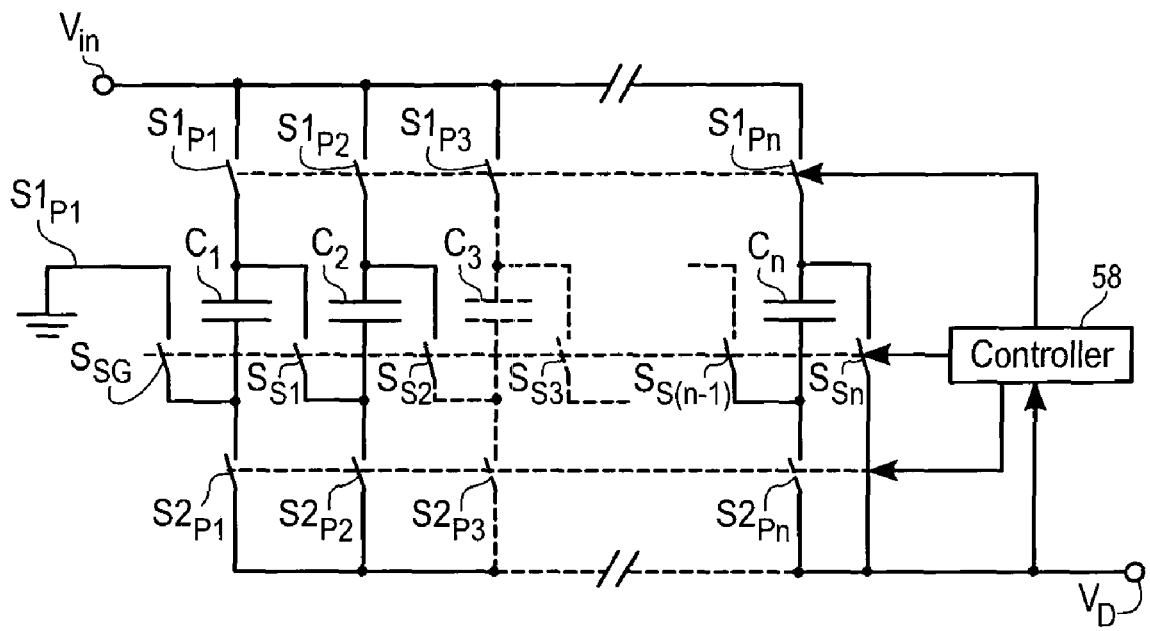
FIGS. 6A, 6B and 6C show variations of the FIG. 3 regulator.
Figure 6B:
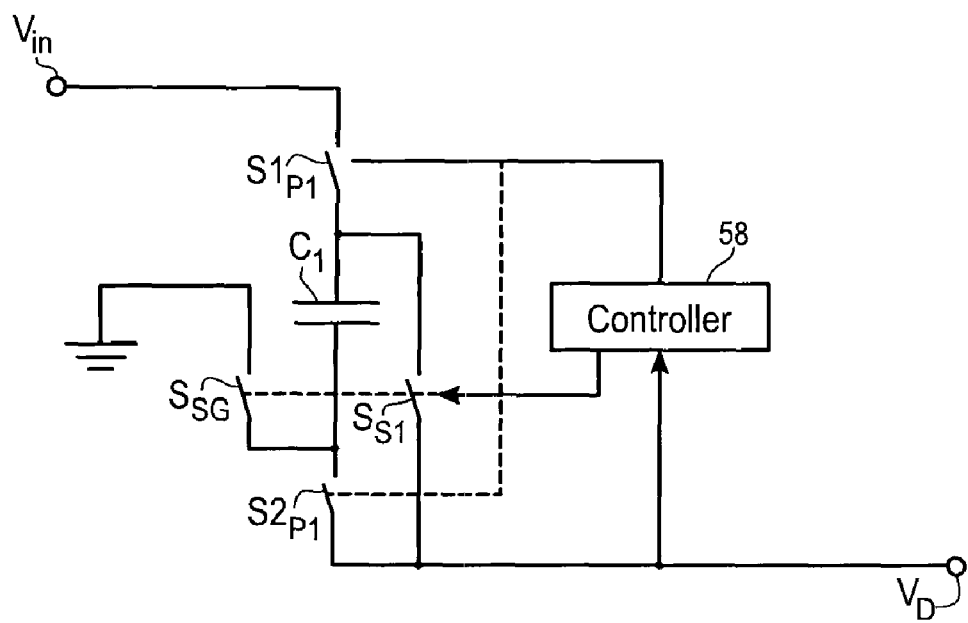
Figure 6C:
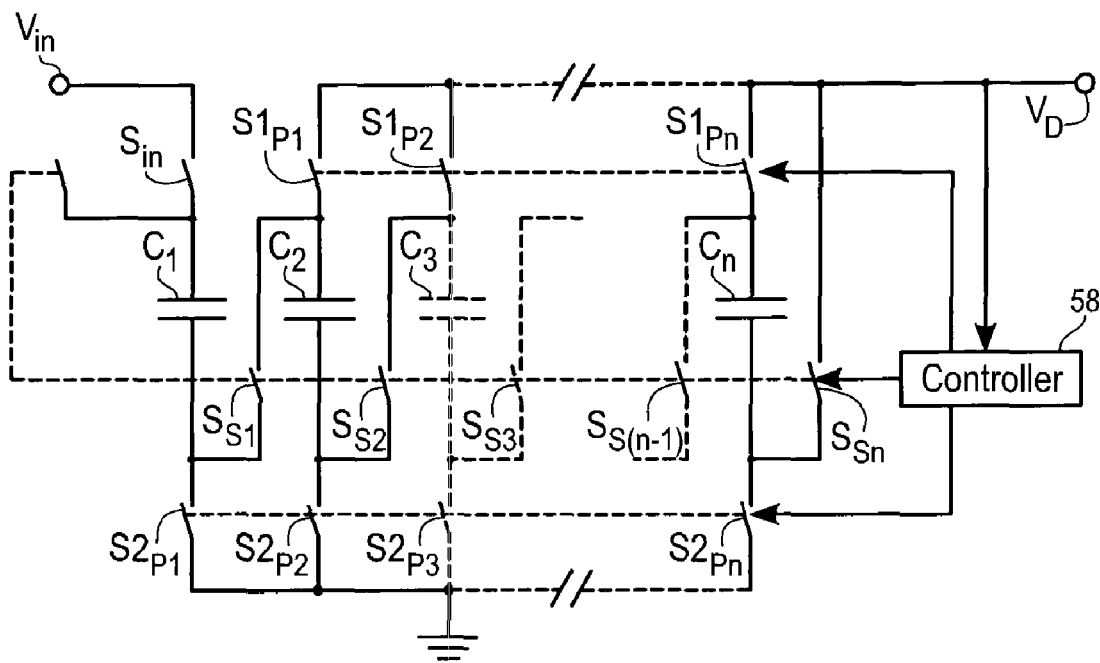

FIGS. 6A, 6B and 6C show schematically variations of the capacitor array and switches portion of the FIG. 3 circuit, all being embodiments in accordance with this disclosure. For the FIG. 6A embodiment, the capacitor array $C_1, C_2, \ldots, C_n$ and switches are arranged for an input voltage $V_{in}$ which is expected to be less than twice the capacitor array output voltage at terminal $V_D$. The switches here are designated $S1_{p1}, \ldots, S1_{pn}$ (first row); $S_{s1}, \ldots, S_{sn}$ (second row) and $S2_{p1}, \ldots, S2_{pn}$ (third row), and switch $S_{SG}$. The number of capacitors used here, illustrated as being "n" in number, is a design choice dependent on the value of $V_D/(V_{in}-V_D)$ as explained in more detail below. Hence all the capacitors here are connected in parallel relative to the input terminal $V_{in}$ when charging. All the parallel connected capacitors charge at once, not one by one as in the FIG. 4 embodiment. However for discharge purposes, the switches are set so all the capacitors are coupled in series to terminal $V_D$.

FIG. 6B shows a simpler embodiment with only a single capacitor $C_1$ in the switched capacitor array which is used when the supply voltage at $V_{in}$ is approximately twice the value of the voltage at $V_D$. The four switches here are designated $S1_{p1}, S2_{p1}, S_{s1}$ and $S_{SG}$.

FIG. 6C shows in another embodiment an arrangement of capacitors and switches for the case where the supply voltage at $V_{in}$ is greater than twice that at $V_D$. Here capacitors $C_1, C_2, \ldots, C_n$ are in series when connected to terminal $V_{in}$. The switches here are arranged somewhat similar, but not the same, as in FIG. 6A, again being arranged in three rows (banks). All the capacitors are connected in parallel to discharge to terminal $V_D$. The number of capacitors n here again depends on the ratio of the voltage at terminal $V_{in}$ to $V_D$.

In the FIG. 6C embodiment for high voltage drop $\{(V_{in}-V_D)>V_D\}$ recovery, all the capacitors in the array are connected in series and then that series connected capacitor array is connected between the power source and the input terminal, and then the capacitors are connected in parallel and discharged to the input terminal. For low voltage drop $\{(V_{in}-V_D)<V_D\}$ recovery, all the capacitors in the array are connected in parallel and then that parallel connected capacitor array is connected between the power source and the input terminal, and then the capacitors are connected in series and discharged to the input terminal.

Table 1 indicates relationships for calculating the capacitor values, numbers, and other important technical parameters for design purposes:

TABLE 1

| Parameter | $V_{in} < 2V_{Dmin}$ | $V_{in} > 2V_{Dmin}$ |
|---|---|---|
| n | $n \geq \dfrac{V_{Dmin} + \Delta V_D + I(3R_{ON} + r_S)}{V_{in} - V_{Dmin} - I(R_{ON} + r_S)}$ | $n \leq \dfrac{V_{in} - V_{Dmin} - I(3R_{ON} + r_S)}{V_{Dmin}|\Delta V_D| I(R_{ON}|r_S)}$ |
| $V_{Cmax}$ | $V_{in} - V_{Dmin} - \dfrac{I}{n}(2R_{ON})$ | $\dfrac{1}{n}\{V_{in} - V_{Dmin} - I(n+1)R_{ON}\}$ |
| $V_{Dmax, Dis}$ | $n(V_{in} - V_{Dmin}) - I((n+3)R_{ON} + (n+1)r_S)$ | $\dfrac{1}{n}[(V_{in} - V_{Dmin}) - I\{(n+3)R_{ON} + (n+1)r_S\}]$ |
| $V_{Dmax, Cha}$ | $\dfrac{1}{n}[nV_{in} - V_{Dmin} - I\{(n+3)R_{ON} + (n+1)r_S\}]$ | $[V_{in} - nV_{Dmin} - I\{(n+3)R_{ON} + (n+1)r_S\}]$ |

TABLE 1-continued

| Parameter | $V_{in} < 2V_{Dmin}$ | $V_{in} > 2V_{Dmin}$ |
|---|---|---|
| $\Delta t_{Dis}$ | $\frac{C}{n}\left[\frac{nV_{in} - (n+1)V_{Dmin}}{I} - \{(n+3)R_{ON} + (n+1)r_S\}\right]$ | $C\left[\frac{V_{in} - (n+1)V_{Dmin}}{I} - \{(n+3)R_{ON} + (n+1)r_S\}\right]$ |
| $\Delta t_{Cha}$ | $C\left[\frac{nV_{in} - (n+1)V_{Dmin}}{I} - \{(n+3)R_{ON} + (n+1)r_S\}\right]$ | $\frac{C}{n}\left[\frac{V_{in} - (n+1)V_{Dmin}}{I} - \{(n+3)R_{ON} + (n+1)r_S\}\right]$ |
| $\eta_r$ | $1 + \frac{1}{n}$ | $1 + n$ |

In Table 1:
$V_{in}$ Input voltage to the circuit
$\Delta V_D$ Expected minimum voltage fluctuation of $V_D$
$R_{ON}$ On resistance of the switch
$r_S$ Internal resistance of the capacitors
n Number of capacitors.
$V_{Cmax}$ Maximum voltage across each capacitor
$V_{Dmax, Dis}$ Maximum voltage at $V_D$ when discharging
$V_{Dmax, Cha}$ Maximum voltage at $V_D$ when charging
$\Delta t_{Dis}$ Time taken to discharge the capacitors to minimum $V_D$ ($V_{Dmin}$) from $V_{Dmax, Cha}$
$\Delta t_{Cha}$ Time taken to charge the capacitors from its discharged voltage until $V_D$ reached to $V_{Dmin}$. When the discharged capacitors start charging $V_D$ goes to $V_{Dmax, Cha}$ and gradually decrease till $V_{Dmin}$
$\eta_r$ Supercapacitor based efficiency improvement factor, which is the overall efficiency increasing factor of the present technique.

$$\eta_r = \frac{\text{Input power when directly connect the regulator to } V_{in}}{\text{Input power when connect the regulator to } V_{in} \text{ through this technique}}$$

Table 1 thereby shows (for the two indicated voltage regimes) equations to select the number of capacitors (n) in the capacitor array, the voltage rating of each capacitor ($V_h$ Cmax) the parameters for finding the switching frequency ($\Delta t_{Dis}$, $\Delta t_{Cha}$), the voltage variation limits of the regulator input ($V_{Dmax.Dis}$, $V_{Dmax.Cha}$) and the relative efficiency increase ($\eta_r$) due to the present method. The two columns of Table 1 $V_{in} < 2V_{Dmin}$ and $V_{in} > 2V_{Dmin}$ show the relationship for the switching schemes of FIGS. 6A and 6C respectively.

These equations are derived based on these assumptions: the power consumed by the controller circuit is negligible compared with the output power; all the capacitors are identical and have equivalent series resistance of $r_s$; all the switches are identical and have ON resistance $R_{ON}$.

Figure 7:
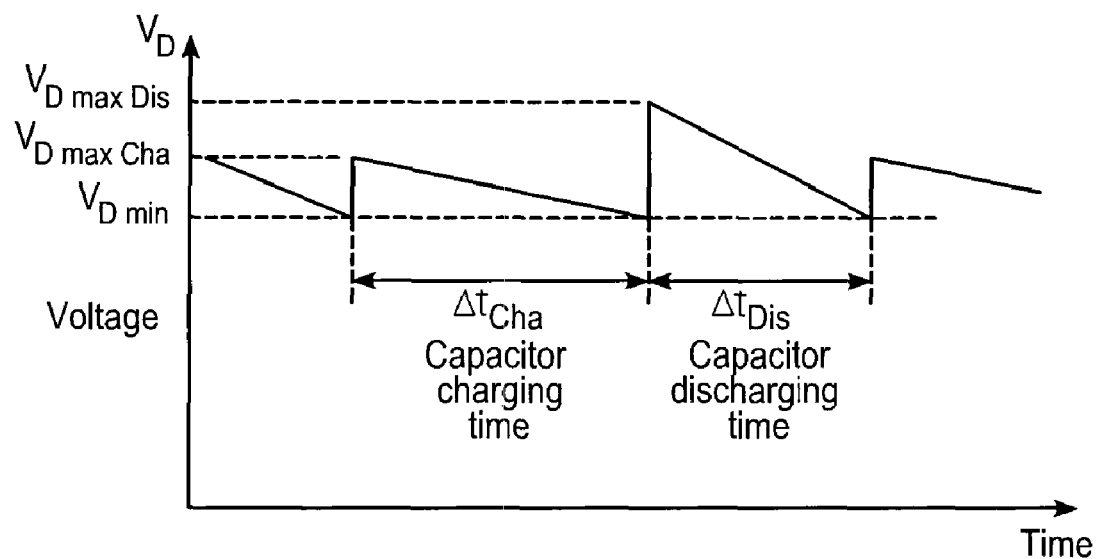
FIG. 7 shows graphically capacitor switching in accordance with FIG. 6B.

FIG. 7 shows (similarly to FIG. 5B) graphically a waveform of the voltage $V_D$ (for the embodiment of FIG. 6B) when a capacitor in the present apparatus is charging and discharging. When the output draws current through the capacitor, the voltage across the capacitor increases from its initial voltage until $V_D$ reaches $V_{Dmin}$. So voltage $V_D$ starts decreasing from $V_{Dmax\ Cha}$ to $V_{Dmin}$. When voltage $V_D$ reaches voltage $V_{Dmin}$ the capacitor starts powering the regulator. At this instance the voltage $V_D$ goes to value $V_{Dmax\ dis}$ and with the discharging of the capacitor, $V_D$ gradually decreases up to voltage $V_{Dmin}$.

It has been determined that with the exemplary FIG. 6B apparatus overall efficiency is about 80%. In the prior art, efficiency is approximately 5/12, less than 42%.

A parallel combination (or a diode connection) of the present voltage regulator can be used for very high current operations, or redundancy of a power supply. Thereby, for very high current applications, multiple instances of the present apparatus are coupled in parallel. This arrangement may include single or multiple banks of super capacitors and controllers, for high current or high voltage output requirements.

This disclosure is illustrative and not limiting; further modifications and improvements will be apparent to those skilled in the art in light of this disclosure and are intended to fall within the scope of the appended claims.

The invention claimed is:

1. A voltage regulation apparatus comprising:
   a power supply terminal adapted to be coupled to a power source;
   a linear voltage regulator circuit having an input terminal;
   a switched capacitor element functioning as a voltage dropper and serially coupled between the power supply terminal and the input terminal of the linear voltage regulator, the switched capacitor element including at least one super capacitor having a capacitance of at least 0.1 farad and at least one transistor or solid state relay; and
   an output terminal coupled to an output terminal of the linear voltage regulator.

2. The apparatus of claim 1, wherein the switched capacitor element includes at least two super capacitors each series coupled to at least one switch, the two super capacitors being capable of being serial or parallel coupled by the at least one transistor or solid state relay relative to one another and to the input terminal of the linear voltage regulator.

3. The apparatus of claim 1, further comprising control logic coupled to operate the switched capacitor element.

4. The apparatus of claim 1, wherein the linear voltage regulator circuit is of the series or shunt type.

5. The apparatus of claim 1, wherein the linear voltage regulator circuit is of the low drop out type.

6. The apparatus of claim 1, wherein in operation the apparatus provides a current of at least one ampere at the output terminal.

7. The apparatus of claim 3, wherein the control logic operates the apparatus in at least three phases, including:
   a first phase where only a first super capacitor in the switched capacitor element is connected;
   a second phase where only a second super capacitor in the switched capacitor element is connected; and
   a third phase where neither of the first and second super capacitors are connected to the power supply terminal but both are connected to the input terminal of the linear voltage regulator.

8. A method of providing a regulated voltage from a power source using a capacitance coupled to an input terminal of a linear voltage regulator, comprising the acts of:
- series coupling a first super capacitor functioning as a voltage dropper and having a capacitance of at least 0.1 farad in the capacitance between the power source and the input terminal;
- disconnecting the first super capacitor and series coupling by a transistor or solid state relay a second super capacitor between the power source and the input terminal of the linear voltage regulator; and
- disconnecting the second super capacitor from the power source and discharging both super capacitors to the input terminal.

9. The method of claim 8, further comprising the acts of:
- series coupling the super capacitors between the power source and the input terminal; and
- disconnecting the super capacitors from the power source, connecting the super capacitors in series and discharging the super capacitors from the input terminal.

10. The method of claim 8, further comprising the acts of:
- series coupling the super capacitors between the power source and the input terminal; and
- disconnecting the super capacitors from the power source, connecting the super capacitors in parallel and discharging the super capacitors to the input terminal.

11. The method of claim 8, wherein the connecting and disconnecting are performed by switches coupled to a control element.

12. The method of claim 8, wherein the linear voltage regulator is of the series or shunt type.

13. The method of claim 8, wherein the linear voltage regulator is of the low drop out type.

14. The method of claim 8, further comprising outputting a current of at least one ampere from the linear voltage regulator.

15. The method of claim 8, wherein a switching rate of the method is less than about 300 Hz.

* * * * *